United States Patent [19]
Langsted

[11] Patent Number: 5,173,595
[45] Date of Patent: Dec. 22, 1992

[54] METHOD AND APPARATUS FOR READING FREE FALLING DOSIMETER PUNCHCODES

[75] Inventor: James M. Langsted, Golden, Colo.

[73] Assignee: The United States of America as represented by the United States Department of Energy, Washington, D.C.

[21] Appl. No.: 560,667

[22] Filed: Jul. 31, 1990

[51] Int. Cl.⁵ .................. G06K 7/10; G06K 13/67
[52] U.S. Cl. .................. 235/458; 235/454; 235/482; 250/569
[58] Field of Search ............ 235/439, 440, 458, 482, 235/454; 250/566, 568, 569

[56] References Cited

U.S. PATENT DOCUMENTS

| | | | |
|---|---|---|---|
| 3,200,194 | 8/1965 | Rabinow | 235/458 |
| 3,592,972 | 7/1971 | Lane | 235/482 |
| 3,638,017 | 1/1972 | Jones et al. | 235/491 |
| 3,857,019 | 12/1974 | Holtey | 235/458 |
| 3,993,893 | 11/1976 | Graf | 235/458 |
| 4,438,328 | 3/1984 | Kuranishi et al. | 235/482 |
| 4,447,715 | 5/1984 | Vulcano | 235/458 |

FOREIGN PATENT DOCUMENTS

| | | | |
|---|---|---|---|
| 1774994 | 4/1978 | Fed. Rep. of Germany | 235/458 |
| 1278907 | 12/1986 | U.S.S.R. | 235/458 |

Primary Examiner—Stuart S. Levy
Assistant Examiner—Edward H. Sikorski
Attorney, Agent, or Firm—Karla Ojanen; James H. Chafin; William R. Moser

[57] ABSTRACT

A punchcode reader is provided for reading data encoded in a punchcode hole array on a dosimeter. The dosimeter falls through a passage in the reader containing photosensor detectors disposed along the passage which provide output signals to a microprocessor. The signals are processed to determine the orientation of the dosimeter in the reader, the location and state of punchcode holes in a two row array thereby decoding the encoded data. Multiple rate of fall calculations are made, and if appropriate matching of the punchcode array is not obtained in three tries, an error signal is outputted to the operator. The punchcode reader also provides for storage of data from multiple dosimeters passed through the reader, and for the output of decoded data to an external display or a computer for further processing.

9 Claims, 7 Drawing Sheets

METHOD AND APPARATUS FOR READING FREE FALLING DOSIMETER PUNCHCODES

"The Government has rights in this invention pursuant to Contract No. DE-AC04-76DP03533 between the U.S. Department of Energy and Rockwell International (now known as EG&G Rocky Flats, Inc.)"

FIELD OF THE INVENTION

The present invention relates to automatic reading of encoded data from an object, and more particularly, is directed to apparatus and method for reading punchcode holes from a data carrying object, such as the Panasonic Model UD-800 dosimeter.

BACKGROUND OF THE INVENTION

Dosimeters are a radiation measurement device and a frequently used in the nuclear field. A dosimeter generally contains a passive device for measurement of radiation exposure, and also contains encoded data in the form of punchcodes, reflecting identification information on the dosimeter. In one respect, the dosimeter can be considered to be a modern version of the "film badge" where identifying information is printed on the outside of the film packet. In a dosimeter, reading the encoded punchcode data provides a similar type of identification information.

As a radiation measurement device, dosimeters are used in personnel protection in the nuclear industry, such as for use in nuclear power plants, infacilities that work with nuclear materials, within the medical profession, and in some cases in environmental radiation situations, such as in uranium mining and milling. In dosimeters of the type with which the invention is concerned, a punchcode is punched into hole positions in two rows that run along one side of the dosimeter, with the punchcode being used as a mechanical means of encoding data, such as identification of the individual or of an assigned unit. The punchcode can be read and displayed by a reader in conjunction with computer-based processing equipment.

There are several manufacturers that use a punchcode array with their dosimeters and one example is the Panasonic Model UD-800 dosimeter. Conventional readers, including those used for reading ht Panasonic Model UD-800 dosimeter, read encoded data, i.e., the punchcode data, by using multiple photosensors. Generally speaking, the dosimeter is mechanically positioned over a photosensor array, and the punchcode holes are detected.

The use of photosensors to read data encoded on a punched card is, of course, conventional. For example, U.S. Pat. No. 3,758,754 describes a reader device which uses light-emitting diodes in conjunction with photodiodes to provide optical reading of a card as the card is passed through a slot containing the photosensor elements. The same patient also discloses the use of encodable data positions int eh form of punched holes arranged in rows on the card that are read by the optical reader elements. However, it is necessary with this device that the card containing the coded data be inserted in a slot in a particular manner, and be moved by the operator to the opposite end of the slot. Not only does this take significant time and require operator involvement to move the card through the equipment, but it does not provide a controlled movement of the card, and requires a specific positioning of the card to function effectively. The lack of a controlled movement of the card lends to limited readability functions, e.g., only "ready" or "fail," and prevents more fully automated reading of the coded data for processing of more detailed card information, such as being able to read closed as well as open hole positions.

Other dosimeter reading equipment require that the dosimeter be taken by a piece of equipment and mechanically fit into a slot, e.g., by use of motors that drive the dosimeter into position, where it is then moved by appropriate apparats through the reader. This is a fairly slow process if one is doing stand-alone reading of thousands of these dosimeters. Also, the mechanical positioning of the dosimeter in the reader is not only time-consuming, but involves mechanical operations that require periodic maintenance and generate reliability problems. Furthermore, existing types of punchcode readers are often found incorporated in other pieces of equipment, which is disadvantageous in terms of the flexibility in use and the portability of the equipment.

Numerous other systems and devices have been described for reading data by means of optical sensors or card reader type of devices. However, such devices generally involve complicated mechanical assemblies, and require an undesired amount of operator involvement. A punchcode reader that is able to read significant amounts of encoded data from a dosimeter is thus desirable and the need exists for a reader adapted to use with a dosimeter that would read punchcodes electronically, and do this in a rapid, yet simple manner, without the disadvantages in terms of speed and mechanical complexity associated with presently available dosimeter readers.

SUMMARY OF THE INVENTION

It is an object of the present invention to eliminate the number of mechanical operations involved in using a punchcode reader, and to provide a punchcode reader that is simpler to use, faster in operation, less costly, and easier to maintain than punchcode readers that are currently available.

In accordance with one aspect of the invention, a punchcode reader is provided for reading encoded information from a dosimeter including an array of punchcode holes therein having a pattern of open and closed holes representative of data relating to the dosimeter and an index notch therein at one end of the array of punchcode holes, the punchcode reader comprising: a housing defining a vertical passage into which the dosimeter is inserted so that the dosimeter will fall by gravity through the passage; photosensor detector means disposed adjacent to the passage along the path of travel of the dosimeter, for detecting the array of holes and index notch of the dosimeter during the travel thereof through the passage, for producing corresponding output signals; signal processing means connected to the photosensor detector means for receiving and processing the output signals therefrom and for determining, based at least on output signals relating to the index notch, the orientation of the dosimeter within the passage and for decoding, after determining the orientation of the dosimeter within the passage, the data relating to the dosimeter based on output signals relating to the pattern of open and closed holes.

Preferably, the detector means comprises a plurality of photosensor detectors, disposed along the path of travel of the dosimeter down through said passage, for detecting the presence and absence of a dosimeter within the passage, for determining the location of the index notch on the dosimeter, and for determining the relative locations of the open holes in the array of punchcode holes.

The processing means preferably comprises RAM storage means for storing the output signals and microprocessor means for receiving said output signals, for controlling storage of the output signals by the RAM storage means, for performing at least one calculation of the rate of fall of the dosimeter through the passage, and for using the rate of fall calculation in determining the locations of the open holes in the punchcode hole array to thereby decode the encoded information.

The punchcode reader advantageously includes guide mans disposed at the top of the passage for guiding the dosimeter into the passage, as well as guide means disposed at the bottom of the passage for directing the movement of the dosimeter after exiting from the passage.

In accordance with a further aspect of the invention, a method is provided for reading encoded data from punchcode hole array of a dosimeter having a notch therein, wherein the method comprises the steps of: inserting a dosimeter in a punchcode reader having a vertical passage therein so that the dosimeter falls by gravity through the passage in the punchcode reader; collecting output data from a plurality of photosensors disposed within the reader adjacent to the passage which sense the location of the punchcard holes of the punchcard hole array as the dosimeter moves down the passage; determining the orientation of the dosimeter in the passage by analyzing output data from at least one photosensor indicating the location of the notch on the dosimeter as the dosimeter travels down the passage; calculating the velocity of the dosimeter during the travel through the passage; and determining the data encoded on the dosimeter based on the determination of the orientation of the dosimeter, the calculated velocity of the dosimeter, and a determination of the location of the open holes in the array.

Preferably, the method includes making first, second and third calculations of the velocity of the dosimeter during the fall through the passage. The first velocity calculation is based upon the rate of travel f the leading edge of the dosimeter, the second velocity calculation is based upon the rate of travel of the trailing edge of the dosimeter, and the third velocity calculation is based upon a travel time determined by detecting both the leading edge and trailing edge of the dosimeter. One of the velocity calculations is then selected for use in decoding the encoded data based upon the location of the first open hole in the punchcode hole array. Advantageously, the method further comprises verifying ht accuracy of the decoding of the punchcode holes based upon the selected velocity calculation.

In an advantageous embodiment, binary coded data is decoded from the locations of open holes of the punchcode hole array, and the binary coded data is converted to ASCII format using a look-up table.

It will be appreciated that advantages such as simplicity of operation and a reduction int eh number of moving parts result from the use of gravity to provide movement of the dosimeter through the punchcode reader, and that a stand-alone reader/processing unit is provided that is free of other unnecessary pieces of equipment.

Other features and advantages of the invention will be set forth in, or apparent from, the detailed description of a preferred embodiment of the invention which follows.

BRIEF DESCRIPTION OF THE DRAWINGS

The invention will become more readily apparent from the following exemplary description taken in conjunction with the accompanying drawings, in which.

DETAILED DESCRIPTION OF THE PREFERRED EMBODIMENTS

Figure 1:
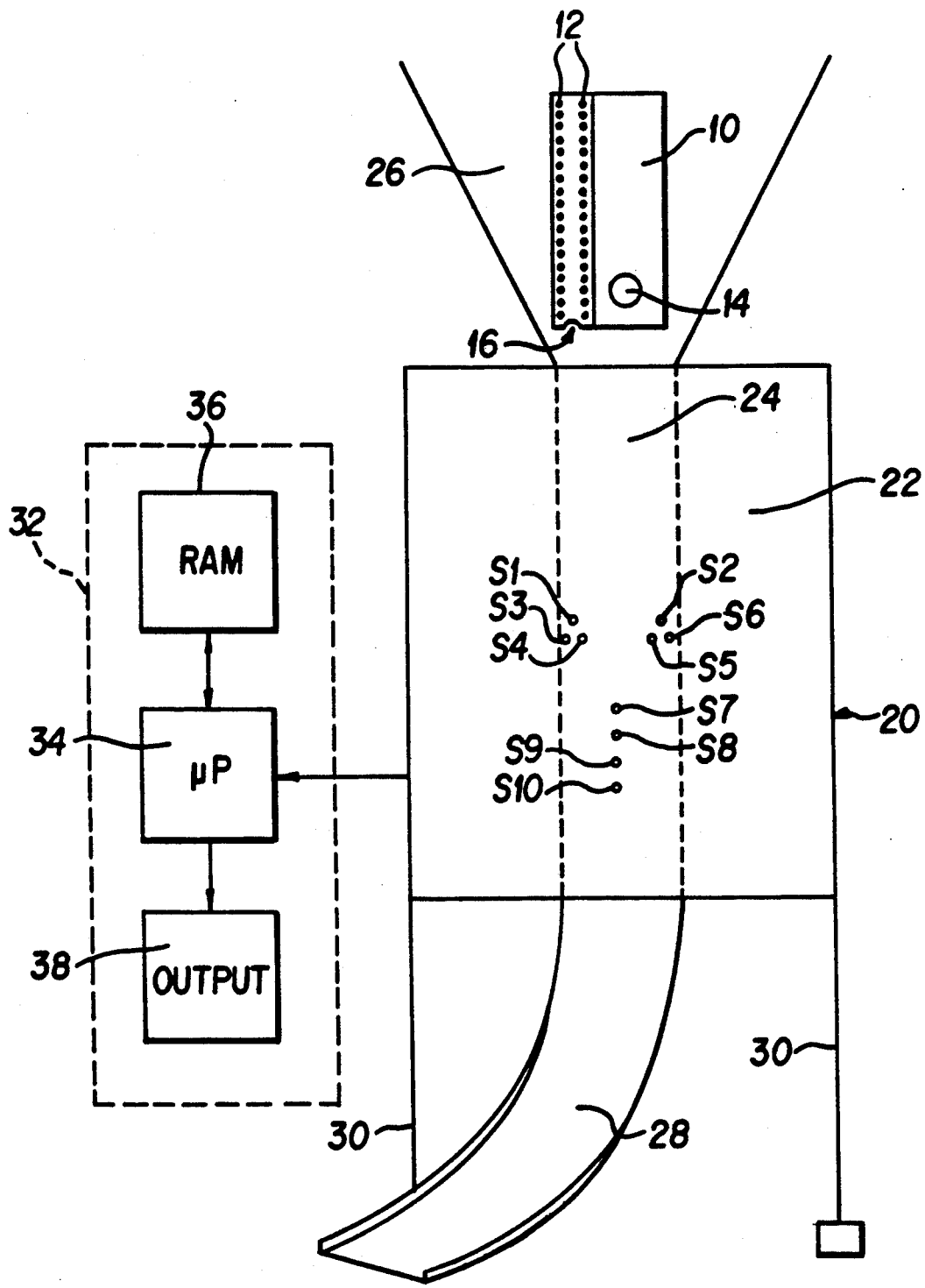
FIG. 1 is a diagram of the punchcode reader and its signal processing unit.

Referring to FIG. 1, a dosimeter, generally denoted 10, is shown which, in a exemplary embodiment, is a Panasonic Model UD-800 dosimeter. FIG. 1 shows the top side of the dosimeter 10 wherein two rows of punchcode holes 12 are positioned longitudinally along one side of the dosimeter. Each row of punchcode holes typically contains twenty holes in which data is encoded in a binary coded decimal (BCD) format. Considering the Panasonic Model UD-800 dosimeter used in a preferred embodiment of the invention, information provided by the encoded data includes a seven-digit identification number, e.g., a personnel identifier, a one-digit badge type identifier, two one-digit rank correction codes (used for dosimeter calibrations), and two single holes for odd parity indication. A thin window 14 is provided through which radiation can pass to be detected by a sensor element (not shown) on an element plate (not shown) inside the dosimeter. An index notch 16 is located at one end of the punchcode hole area and is used in determining the orientation of the dosimeter in the punchcode reader described below. Dosimeter 10 has typical dimensions of 49 mm × 32 mm × 5 mm.

FIG. 1 also shows a punchcode reader, generally designated 20, which, in a preferred embodiment, comprises a metal block or housing unit 22 with a vertical passage 24 machined therethrough. A metal guide 26 is positioned at the top of the passage 24 for guiding dosimeter 10 into the input of passage 24 of the punchcode reader 20 so that dosimeter 10 falls or drops down through passage 24. The dosimeter 10 exits from passage 24 onto a chute 28 which serves to guide the dosimeter 10 to a designated area, such as onto a work surface. Punchcode reader 20 is mounted on legs 30 for ease in attaching chute 28 to the output of the passage 24.

Photosensor detectors S1–S10 are mounted within passage 24 and arranged in three separate configurations. More specifically, photosensors S1, S3 and S4 are arranged in a first triangular configuration, photosensors S2, S5 and S6 are arranged in another triangular configuration, and photosensors S7, S8, S9 and S10 are arranged in a vertical straight line configuration. The four photosensors S7–S10, located along the center of the passage, provide signal data of the location of the dosimeter 10 at a given time as dosimeter 10 falls down the passage 24. While four photosensors are shown and each photosensor S7–S10 provides additional location data, the use of four photosensors is not essential for carrying out the reading of the punchcode holes according to the invention and, accordingly, only photosensor S7 is described below.

Signals from the photosensors S1–S10 are provided as input to an electronic processing unit 32, which includes a microprocessor 34, RAM storage 36 and an output unit 38 which could be, e.g., a printer terminal, a CRT display, or an input to a computer for further processing. Microprocessor 34 can be, for example, a Rockwell R6511Q microprocessor, although many other commercially available microprocessors can, or course, be used.

Turning now to a typical operation f the punchcode reader system according to a preferred embodiment of the invention, dosimeter 10 is placed in metal guide 26 by the operator. The dosimeter 10 falls by gravity into passage 24. During the downward travel thereof, dosimeter 10 passes the photosensor groupings S1, S3 and S4; S2, S5 and S6; and S7 (or S7-S10 if all are used). Dosimeter 10 then exits from passage 24 into chute 28 and onto a work surface. The punchcode reader 20 need only be, for example, six inches to one foot in height.

Considering the operation of the photosensors in more detail, as dosimeter 10 falls through the passage 24, photosensors S1 and S2 detect the presence of the dosimeter 10. How this is done depends on the relative position of index notch 16. Four different positions of the index notch 16 on the dosimeter 10 are possible, including that illustrated in FIG. 1, e.g., if dosimeter 10 is turned over with the same end forwardmost, index notch 16 and punchcode hole array 12 will be located along the opposite (right) side of passage 24. Further, if the opposite end of dosimeter 10 is inserted first, index notch 16 will be located in the rearmost end and will be located on one or the other side of passage 24 depending on whether the dosimeter 10 faces up (as shown in FIG. 1) or down. If dosimeter 10 is positioned as shown, the dosimeter 10 will be first detected by photosensor S2 while if dosimeter 10 si turned around, the dosimeter will first be detected by photosensor S1. Moreover, if notch 16 is located on the trailing rear edge of the dosimeter 10 when the dosimeter is placed into the punchcode reader 20, either sensors S1 or S2 will detect the location of the notch 16, based upon passage of the rearmost trailing edge, and depending on whether dosimeter 10 faces up or down.

Photosensors S3, S4 and S5, S6 are used to detect the presence or absence of punchcode holes in two rows of the punchcode array 12. Again, if the dosimeter 10 is placed into passage 24 with punchcode holes 12 on the left side, photosensors S3 and S4 provide the hole detection, whereas if the dosimeter 10 is placed in passage 24 in the reverse manner, i.e., with the array of holes 12 on the opposite (right) side of the dosimeter 10, photosensors S5 and S6 provide the detection.

The microprocessor 34 of signal processing unit 32 enables data represented by the photosensor signals to be rapidly collected form each other photosensors S1-S7 following the detection of a dosimeter 10 within the passage 24. Signals are transmitted form the photosensors, and data is collected by microprocessor 34 and stored in RAM 36 much faster than the rate at which the punchcode holes pass across the photosensor detectors.

The timing of ht fall of the dosimeter through passage 24 is performed using photosensors S1 and S2 which detect the leading and trailing edges of dosimeter 10. This timing is necessary to match the data collected from other photosensors with the location of the dosimeter during its fall to determine whether each punchcode hole is punched, i.e., open, or not.

The rate of travel of dosimeter 10 down passage 24 is measured using the time difference between the detection of leading edge by photosensor S1 and the detection of the same leading edge by photosensors S3-S4 (or between photosensor S2 and photosensors S5-S6 if the dosimeter 10 is inserted with the rows of punchcode holes on the opposite side of the passage). A third measurement of the rate of fall is made on trailing edge of the dosimeter, i.e., by measuring the time difference between the times that the trailing edge passes by photosensor S1 and photosensors S3-S4. As explained below, these three data measurements are used with an extrapolation process to estimate the location of the dosimeter 10 within passage 24 as a function of time to provide hole location data. This hole location data is matched with the punchcode hole detection data from photosensors S3 and S4 (or from S5 and S6 depending on the orientation of the dosimeter 10 as it falls through the passage). The presence or absence of punchcode holes are determined, the badge coding is decoded and the parity is checked.

Microprocessor 34, in conjunction with RAM 36, takes a very rapid picture of dosimeter 10 based on output photosensor data signals generated as the dosimeter 10 moves down through the passage 24. The microprocessor 34 can respond to a series of very rapidly occurring measurements by storing in RAM 36 the data signals associated with the multiple loops or readings that are taken as a dosimeter passes through the reader. For example, 200-300 bytes of data in RAM 36 can be produced if the program of the microprocessor 34 loops that many times, i.e., takes that many discrete data readings, where each byte in the preferred embodiment contains seven bits, one bit of data form each photosensor. Once the data is collected and stored, the microprocessor 34 analyzes the data and makes appropriate measurements, such as rates of fall (velocities) and hole distances on the dosimeter, and determines where the holes should be at any particular time. Hence, a picture of the hole pattern, containing both punched and unpunched holes, is produced to enable reading of the badge identification and other data encoded on the dosimeter.

As noted above, the decoded identification data is outputted to a display unit 38, such as a printer report or a CRT display as part of the signal processing unit 32. The identification data could also be outputted to a computer interface connected with appropriate handshaking, and an audible indication of successful dosimeter identification produced. If the punchcode reader is operated to provide data on one dosimeter at a time, the microprocessor 34 then waits for the next dosimeter to be read and the data processing procedure is repeated with data from the next dosimeter outputted to the display unit 38. The system could also be operated by reading and storing data from a number of dosimeters put through the reader, with the microprocessor 34 retrieving the stored data at a later time and then outputting identification associated with each of the dosimeters.

Figure 2A:
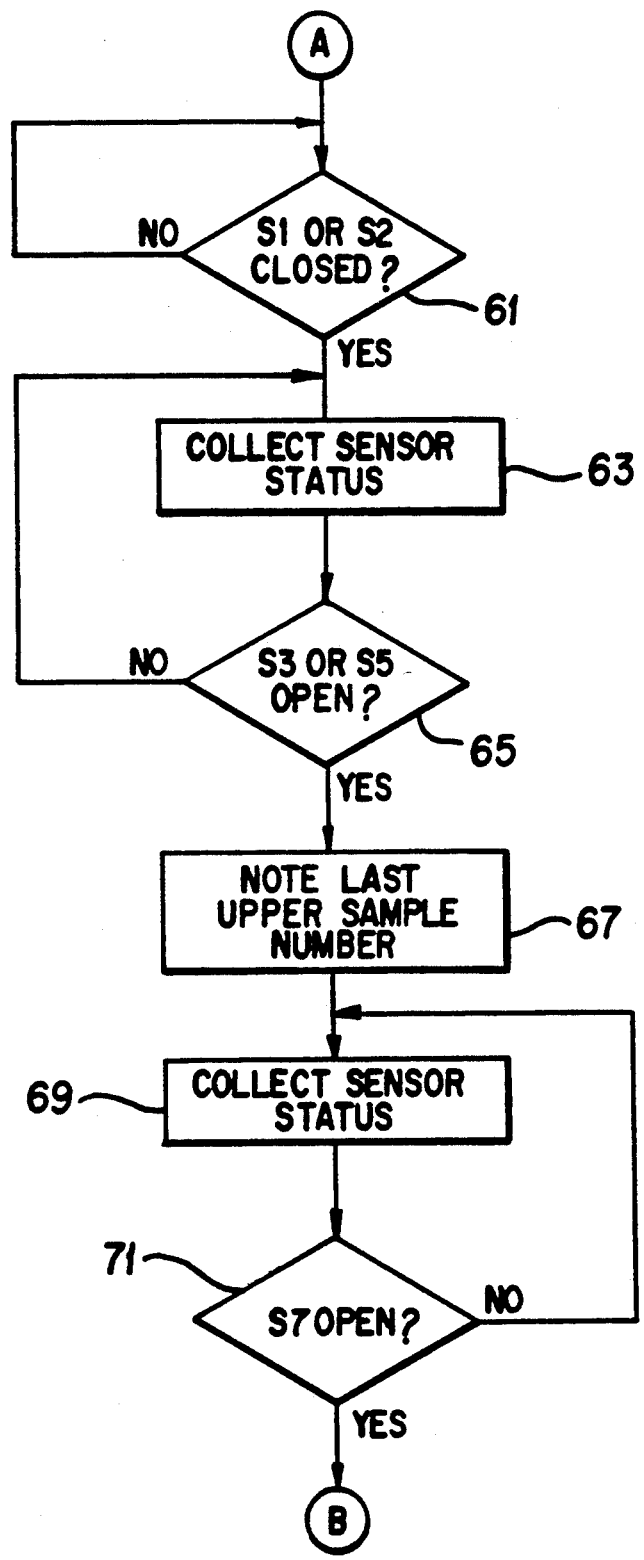
FIGS. 2(a)–2(g) are flow diagrams showing steps of the microprocessor in acquiring and processing data from the punchcard reader.
Figure 2B:
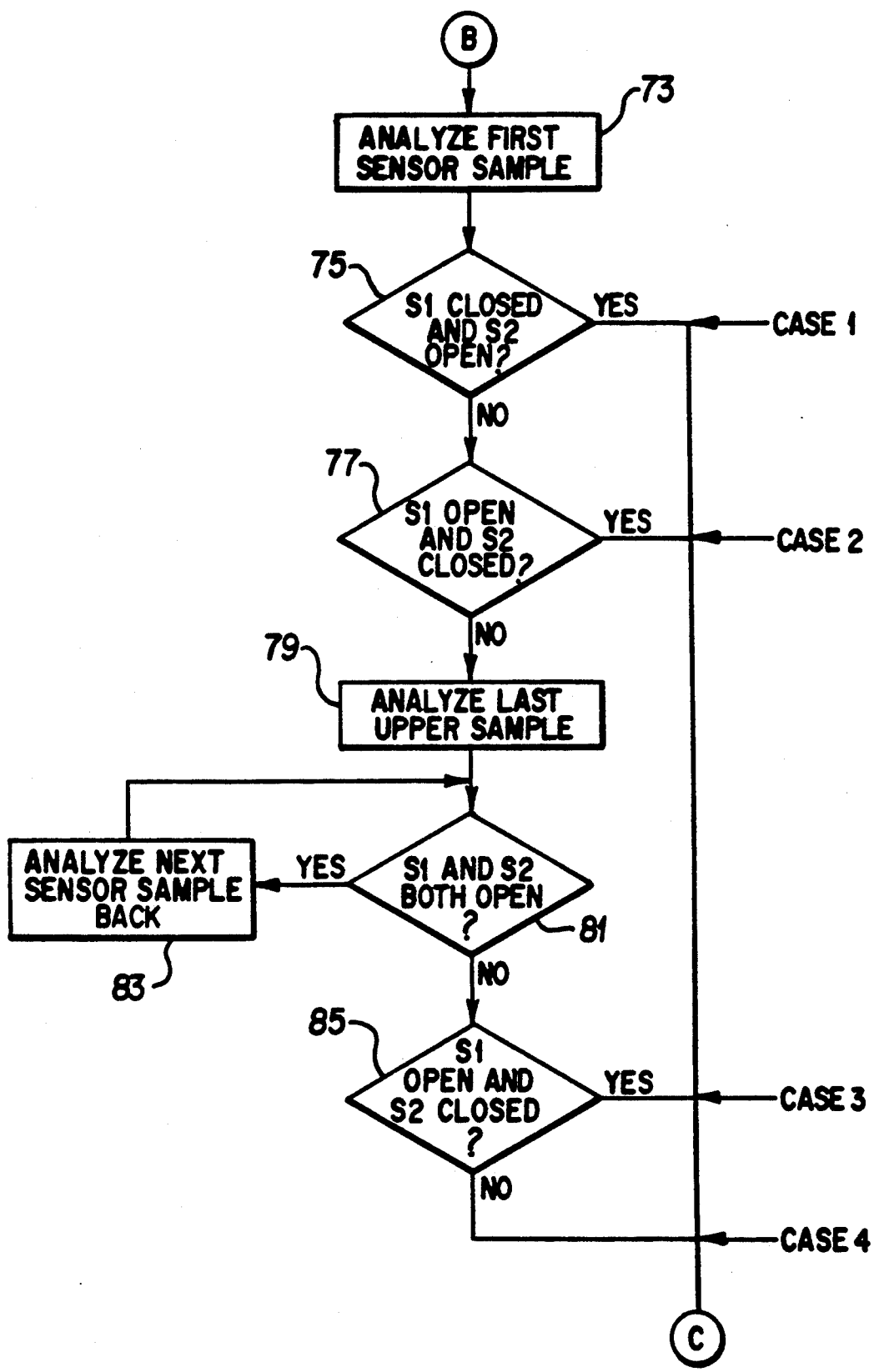
Figure 2C:
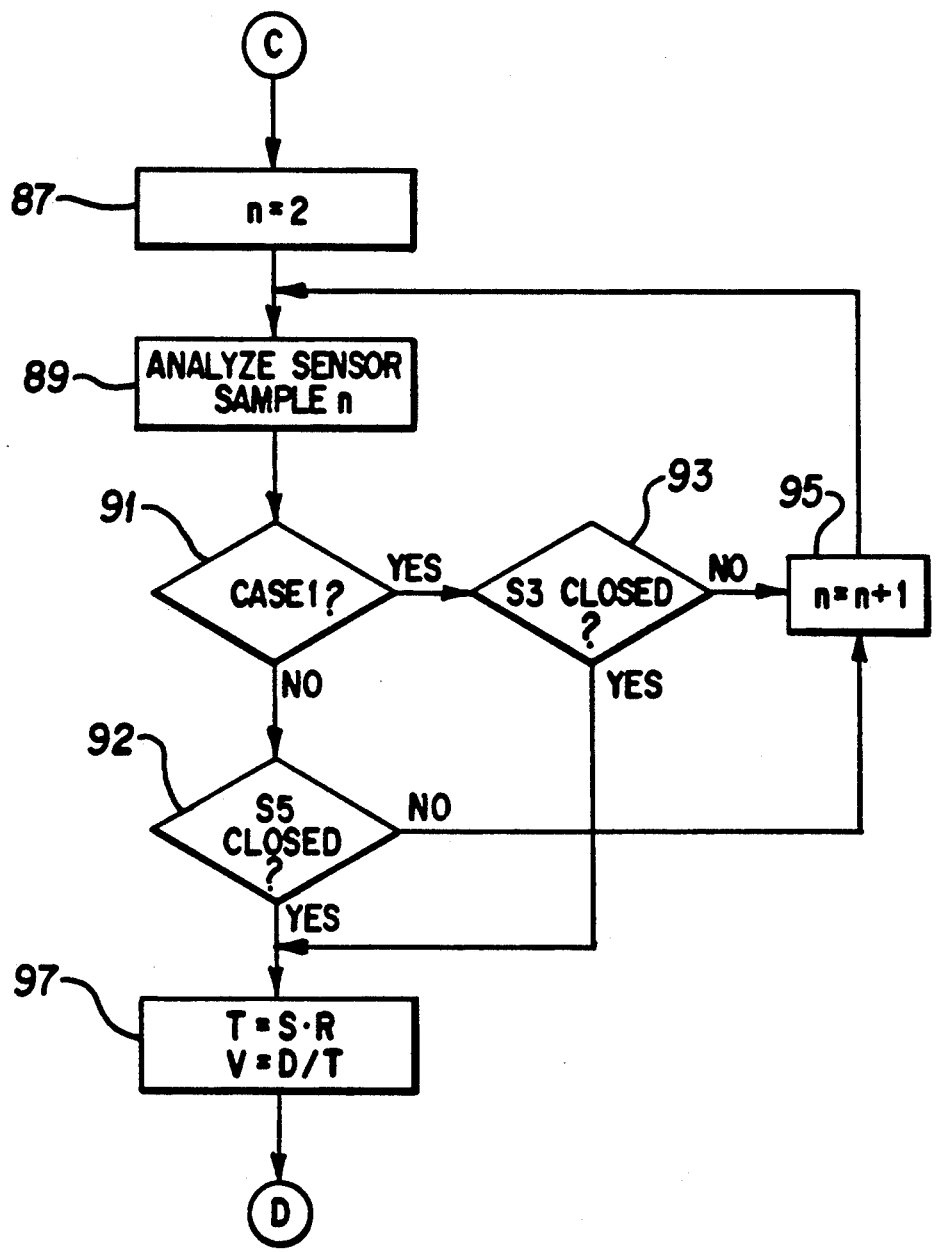
Figure 2D:
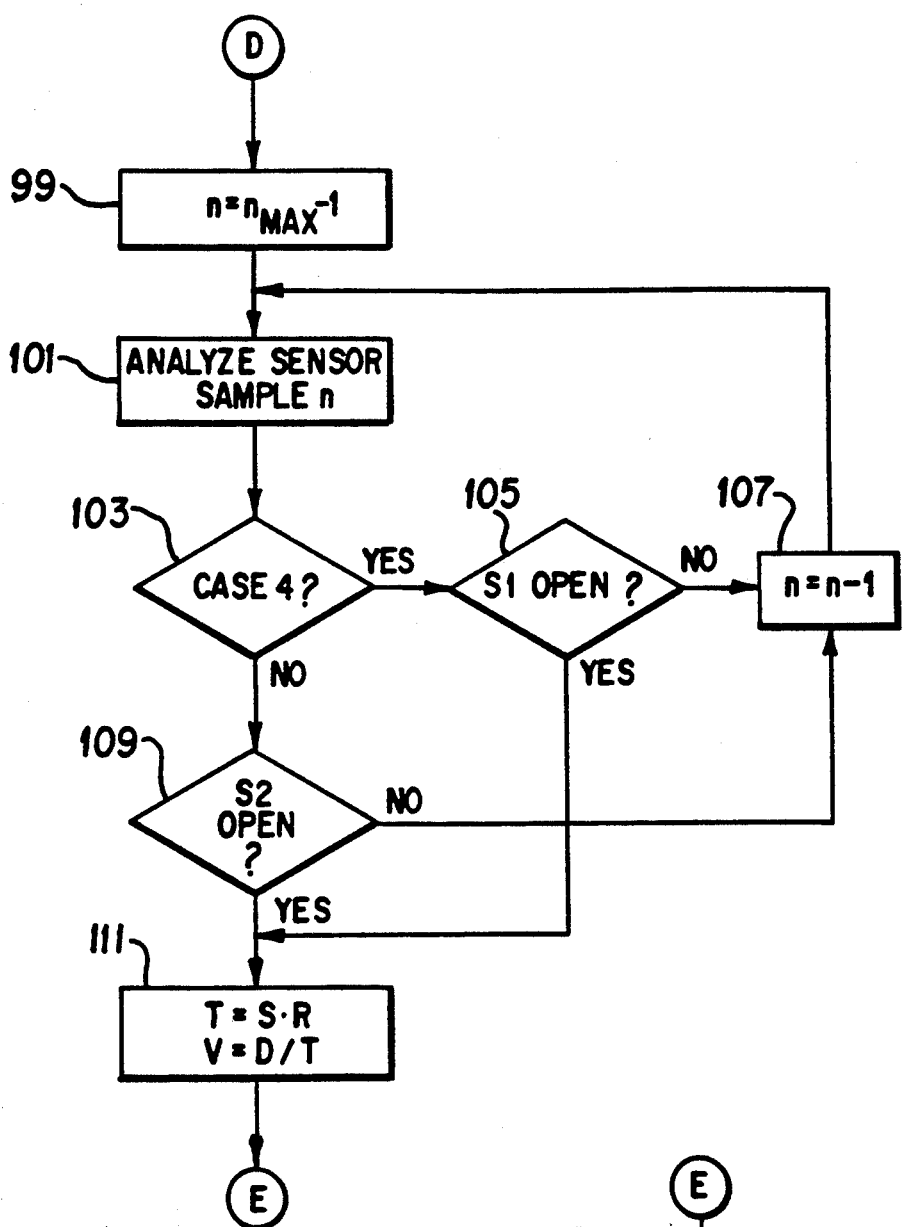
Figure 2E:
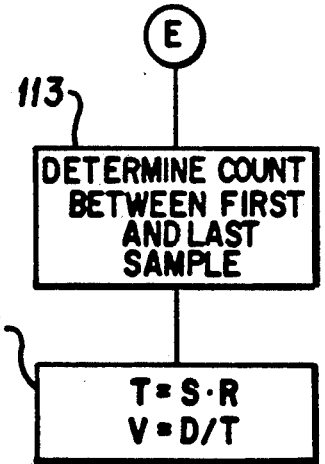
Figure 2F:
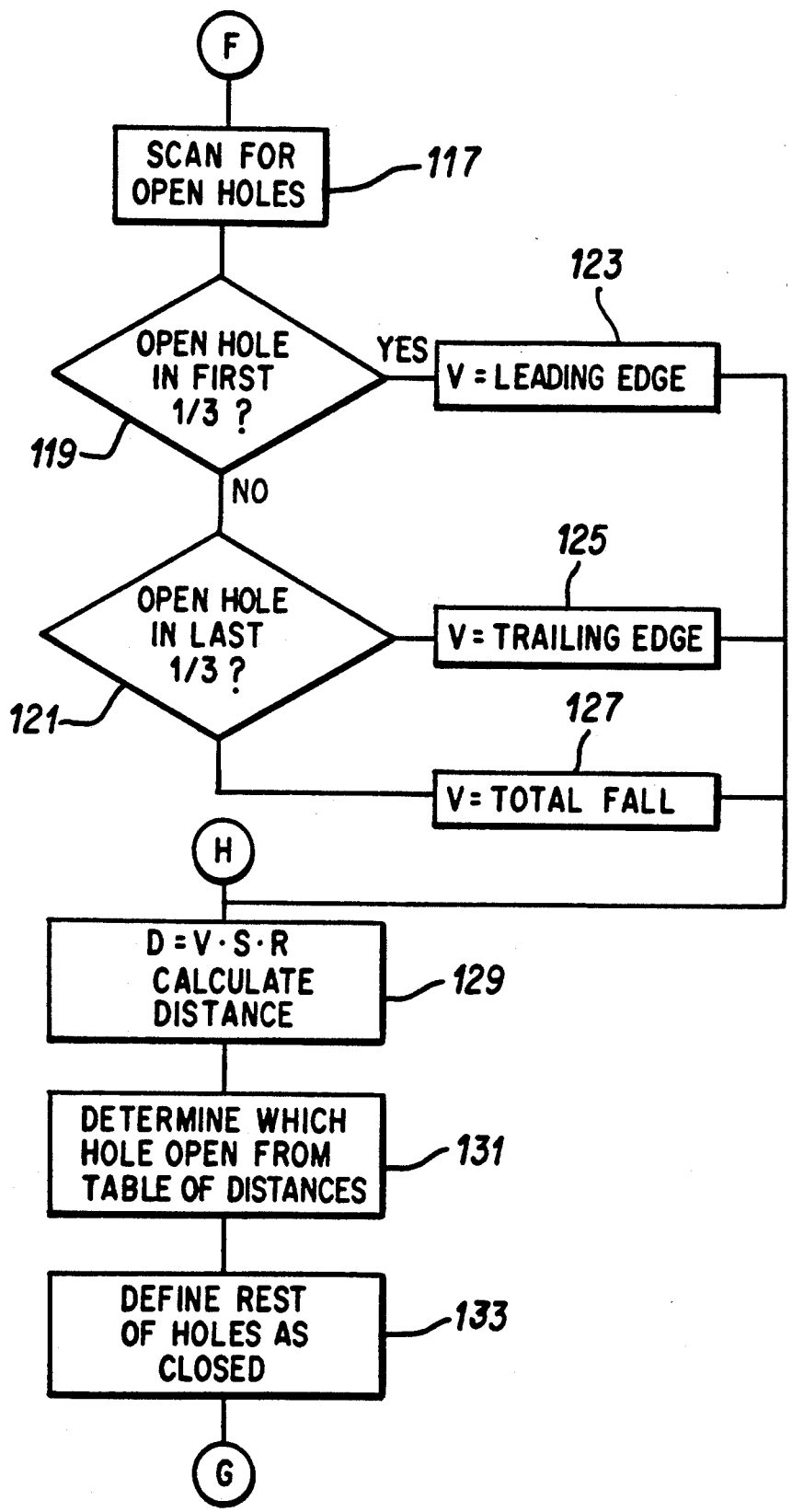
Figure 2G:
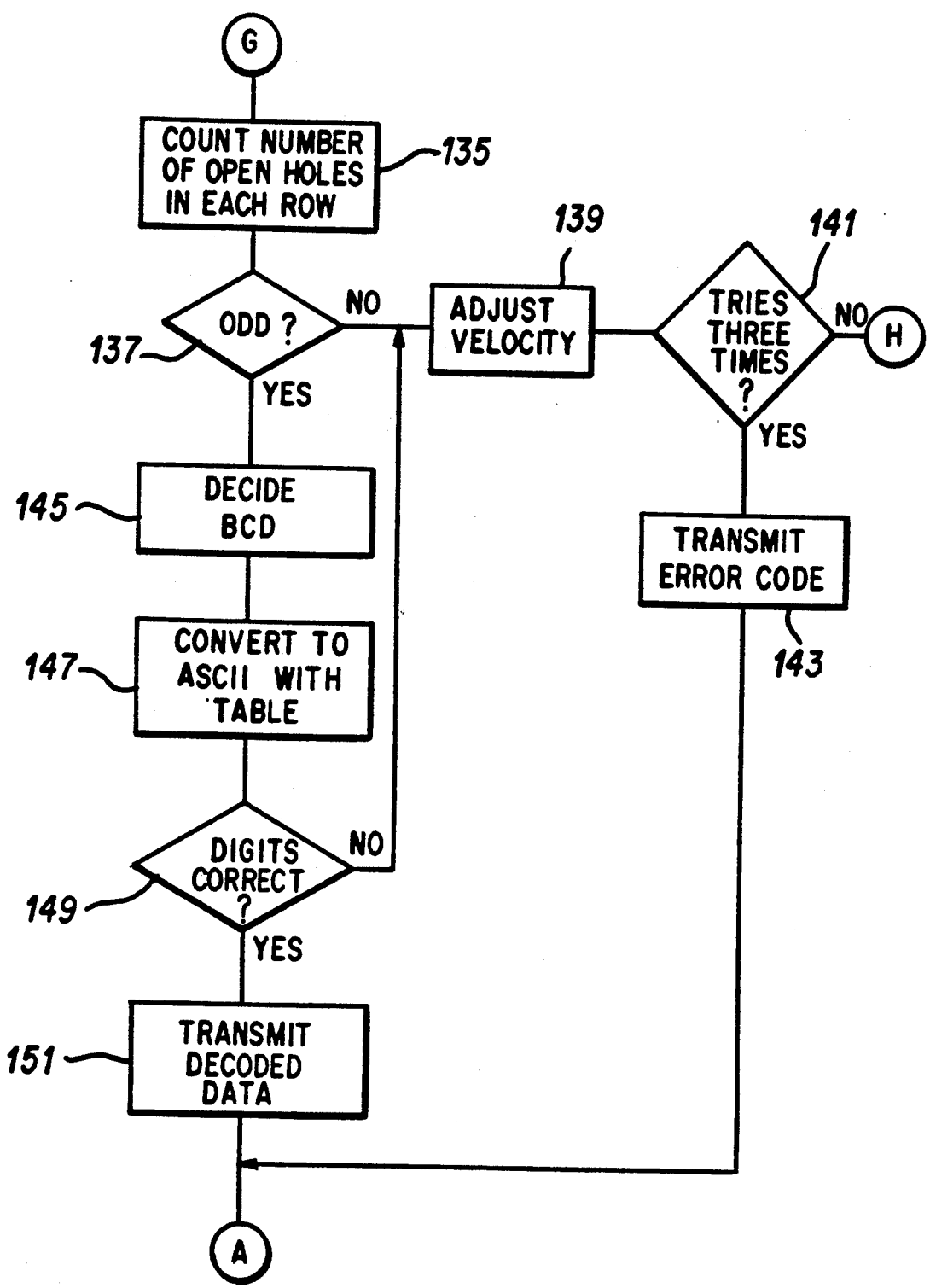

FIGS. 2(a)-2(g) are flow diagrams showing the sequence of steps used in the detection and processing of data from the dosimeter 10. The flow diagram of FIG. 2(a) generally shows the procedure by which data is collected by the photosensors S1 through S7 and stored in RAM storage 36. The flow diagram of FIG. 2(b) includes the first step in analyzing the collected data. The orientation of the dosimeter 10 is determined and allows the dosimeter reader to function effectively regardless of the orientation of the dosimeter when placed in the reader. As noted above, there are four possibilities which are indicated in FIG. 2(b), viz, case 1 wherein the notch is on the lower right of the dosimeter 10, case 2 wherein the notch is on the lower left, case 3 wherein the notch is on the upper left, and case 4 wherein the notch is on the upper right. FIG. 2(c) presents the first of three velocity measurements, specifically, a measure of the velocity based on the leading edge of the dosimeter. FIG. 2(d) sets forth the procedure for the second velocity measurement, based upon the time interval between the passage of the trailing edge of the dosimeter 10 by two different sensors. FIG. 2(e) is concerned with a third measurement of velocity based upon a measurement of time interval between the leading edge of the dosimeter passing photosensor S1 and the trailing edge passing photosensor S7. FIG. 2(f) concerns a method for selecting the best estimate of the speed of the dosimeter and, using that speed estimate, determining which holes are open and which are closed in the punchcode hole array. FIG. 2(g) sets forth a method for checking the accuracy of the measurements, based upon the unique odd parity of the Panasonic UD-800 dosimeter. An error code is outputted if there if not a correct match after three attempts; otherwise, the velocity parameter is adjusted and the decoding is attempted again. If, however, there is a match, the binary coded decimal data is decoded and converted to ASCII by means of a look-up table in the microprocessor 34. The accuracy of the conversion is checked and verified, finally an output is provided. The process the returns to the beginning of the procedure in FIG. 2(a), and the punchcode reader waists for the next dosimeter to be read.

Considering the steps associated with the flow diagram of FIGS. 2(a)-2(g) and referring first to FIG. 2(a), the sequence starts by determining whether either photosensor S1 or S2 is closed, as indicated by decision diamond 61. If yes, as indicated by operational block 63, data from all photosensors are read and collected by microprocessor 34 and put into RAM storage 36 with output data form the seven photosensors are stored in one byte of memory. As indicated by decision diamond 65, photosensors S3 and S5 are checked to see if either is open, and if not, the process loops until either S3 or S5 is open. Then, as indicated by operational block 67, microprocessor 34 notes the data location when the trailing edge of the dosimeter 10 passes photosensors S3, S4, S5 and S6. As indicated by operational block 69, data of sensor status is collected form all photosensors, and that process continues in a looped sequence until photosensor S7, as indicated by decision diamond 71, is open, which indicates that the trailing edge of dosimeter 10 has passed that last photosensor.

The looping of the process to collect data form the dosimeter could be repeated two hundred or more times, with data from each photosensor collected with each loop. Thus, for example, two hundred bytes of data could be collected during the procedure of FIG. 2(a) as the dosimeter 10 falls through the passage 24.

The process of FIG. 2(b) starts the analysis of the collected data, and as indicated by block 73, data in the first byte (information from each photosensor S1-S7) is examined. As indicated by decision diamond 75, the question is then asked whether photosensor S1 is closed and S2 is open. If yes, a "case 1" situation is presented, indicating that notch 16 is on the lower right of the dosimeter 10. If no, the data is examined as indicated by decision diamond 77 to determine if photosensor S1 is open and S2 closed. If yes, a "case 2" situation is presented indicating the notch 16 is on the lower left. If no, as indicated by block 79, an analysis is provided of the data form the last upper sample, i.e., the last upper loop, which is the loop number during which it was determined that the trailing edge of the dosimeter passed past the photosensors S3, S4, S5 and S6. The data is then checked, as indicated by decision diamond 81, to determine if photosensor S1 and S2 were both open, and if yes, the analysis backs up, as shown by block 83, to the prior sample (loop) and looks at the byte of data form that loop. This back-up process continues until it is determined that photosensors S1 and S2 are not both open. Then, as indicated by block 85, the system checks the data for a situation wherein photosensor S1 was open and S2 was closed. Depending on the answer, there is either a "case 3" situation indicating the notch 16 to be on the upper left, or a "case 4" situation indicating the notch 16 to be on the upper right. The determination of the location of the notch 16 allows the microprocessor to ignore data from irrelevant photosensors and examine only data from photosensors activated during the presence of the dosimeter 10 in the passage 24.

The procedure of FIG. 2(c) provides for a first calculation of the velocity of the dosimeter through the passage. The dosimeter 10 may be impeded or disturbed during its fall, and therefore, not have a constant velocity throughout its travel. As noted above, the method of the invention provides for making three velocity measurements and, thereafter, for making a determination of which velocity is the most accurate in obtaining a "data picture" of the punchcode hole array.

As indicated by block 87 of FIG. 2(c), a determination is first made of the number, n, of the data sample or loop number of the data collection process of FIG. 2(a). The data from loop "n" is analyzed, as indicated by block 89, and if a "case 1" situation exists, as indicated by decision diamond 91, a check is made (block 93) to see whether photosensor S3 was closed and, if not, the loop is advanced by one (block 95) and repeated in the loop, as shown. If photosensor S3 was closed, the process is advanced and time and velocity calculations are made as described below (block 97).

If a "case 1" situation does not exist, a determination is made (decision diamond 92) as to whether photosensor S5 was closed. If the answer is negative, the process loops as shown, whereby "n" is advanced by one and the analysis repeated. If photosensor S5 is closed, the calculations indicated by block 97 are performed. In particular, time is calculated by multiplying the sample count (for example, the twentieth sample of data taken, i.e., the twentieth loop) by the sample rate, e.g., ten times per second, which gives the time into the fall at which data form the loop being analyzed was taken. Velocity is determined form the time information by dividing the distance between the sensor in question (a known quantity for each photosensor) by the calculated time.

The second velocity measurement is performed using the procedure of FIG. 2(d). As indicated by block 99, the first data sample analyzed is set equal to the maximum number of data samples taken minus one, e.g., 300−1=299. The data from that sample si analyzed as indicated by block 101, in a manner similar to that represented by operational block 89 of FIG. 2(c). A determination is made (decision diamond 103) as to whether a "case 4" situation is presented. If yes, a determination is made (decision diamond 105) whether photosensor S1 was open. If not, the number "n" is reduced by one (block 107) and the loop is repeated for the corresponding sample. If photosensor S1 was open, the procedure advances to a second velocity calculation, indicated by block 111.

If a "case 4" situation is not presented (decision diamond 103), then query is made (decision diamond 109) as to whether photosensor S2 was open; if not, the sample is again reduced by one and the loop repeated. If photosensor S2 was open, the time and velocity calculations are made (block 111). The calculations made are the same as those described above. Thus, the procedure of FIG. 2(d) essentially backs up through the data until a particular photosensor condition is seen to exist, whereupon the card location can be ascertained and a velocity calculation made.

The third velocity calculation is made according to the procedure of FIG. 2(e) and is based upon a time measurement made between the leading edge and the trailing edge of the dosimeter. As indicated by block 113, the system determines the number of counts (loops) between when the leading edge is sampled (photosensor S1) and when the trailing edge is sampled (photosensor S7). The velocity calculation is made using this information, as indicated by block 115, in the same manner as set forth above.

The best estimate of velocity of the dosimeter 10 down the passage 24 for a given hole is obtained by the procedure of FIG. 2(f). The dosimeter 10 is scanned for open holes, as indicated by block 117, among the two rows of punchcode holes 12. The question is then asked (decision diamond 119) if the first open hole detected from the scan occurs in the top one-third area of the punchcode holes. If yes, the velocity calculated based upon the leading edge of the dosimeter is selected (block 123). If the hole does not occur in the first one-third portion of the dosimeter, the answer to whether the first open hole occurs in the bottom one-third of the punchcard holes 12 (decision diamond 121) determines whether the velocity chosen is to be based upon the trailing edge of the dosimeter (block 125) or based upon the total fall of the dosimeter (block 127).

The distance is next calculated (block 129) by multiplying the velocity times the sample number (loop number) times the sample rate. Next, as indicated by block 131, the open hole is determined from a look-up table of distances in the microprocessor to relate the distance calculated, with a particular hole on dosimeter 10. As indicated by block 133, the rest of the holes are then defined as being closed.

Referring to FIG. 2(g), the number of open holes at each row is counted (block 135). If that number is not odd (as determined by decision diamond 137), the velocity used is adjusted (block 139) by using one of the other two velocity calculations. This procedure is repeated up to three times (decision diamond 141) in an attempt to arrive at the result of having an odd number of open holes in each row. It is an unique characteristic of some dosimeters, including the Panasonic UD-800, that an odd number of holes are punched in each row.

Once the existence of an odd number of holes in each row is verified, the binary boded decimal data is decoded (block 145). The numbers are coded in the holes using BCD format, e.g., any group of four holes can represent one digit. The decoded BCD data is converted to ASCII format (block 147) using a look-up table stored in the microprocessor. This allows the data to be compatible with a computer format. As indicated by operational block 149, verification of whether the data at this point is compatible with what can be punched into the dosimeter determines if the digits are correct. If the information is not correct, the process branches to the loop at the point where the velocity is again adjusted and three attempts are made to establish a proper odd hole count in each row, as indicated. Where the decoded data digits are verified as correct, the decoded data is transmitted or otherwise outputted to output unit 38. The process then returns to the beginning of the procedure of FIG. 2(a) and is repeated for the next dosimeter.

The calculations associated with flow chart 2(a)-2(g) are performed substantially instantaneously so that an output is provided as fast as an operator can place dosimeters into the reader. The procedure is carried out by the programmable microprocessor 34 so that variations in details of the procedure can be adjusted according to the preference of the operator or to conform to a particular dosimeter being read.

Although the present invention has been described relative to exemplary embodiments thereof, it will be understood to those skilled in the art that variations and modifications can be effected in these exemplary embodiments without departing form the scope and spirit of the invention.

I claim:

1. A punchcode reader for reading encoded information from a dosimeter having an array of punchcode holes therein having a pattern of open and closed holes representative of data and further having an index notch therein at one end of the array of punchcode holes, said punchcode reader comprising:
   (a) a housing defining a vertical passage into which said dosimeter is inserted and will fall by gravity through the passage;
   (b) photosensor detector means, disposed adjacent to said passage along the path of travel of said dosimeter, for detecting said array of punchcode holes and said index notch during the travel of said dosimeter through said passage thereby producing output data;
   (c) processing means connected to said photosensor detector means for receiving and processing said output data, for determining the orientation of said dosimeter within said passage, for calculating the velocity of said dosimeter as it falls through said vertical passage, and for decoding said output data corresponding to said patterns of open and closed holes of said array and said velocity calculation.

2. A punchcode reader according to claim 1, wherein said photosensor detector means comprises a plurality of photosensor detectors for detecting the presence of said dosimeter within said passage, for determining the location of said index notch on said dosimeter, for determining the location of open holes in said array of punchcode holes and for detecting the time in which said holes pass across said photosensor detectors.

3. A punchcode reader for reading encoded information from a dosimeter having an array of punchcode holes therein, having a pattern of open and closed holes representative of data, and further having an index notch therein at one end of the array of punchcode holes, said punchcode reader comprising:
   (a) a housing defining a vertical passage into which said dosimeter is inserted and will fall by gravity through said passage;

(b) a plurality of photosensor detectors disposed adjacent to said passage along the path of travel of said dosimeter for detecting the presence of said dosimeter within said passage, for detecting the location of said index notch on said dosimeter, for detecting the location of open holes in said array of punchcode holes and for detecting the time in which said holes pass across said photosensor detectors, thereby producing output data;

(c) processing means connected to said plurality of photosensor detectors, comprising RAM storage means for storing said output data, microprocessor means for receiving said output data and for controlling said storage means, for determining the orientation of said dosimeter within said passage, for performing at least one calculation of the rate of fall of said dosimeter through said passage, and for using said calculation to determine the relative locations of open holes in said punchcode hole array and for decoding said output data corresponding to said patterns of open and closed holes of said array and said time that said holes pass through said housing.

4. A punchcode reader according to claim 1, further comprising guide means disposed at the top of said passage for guiding said dosimeter into said passage.

5. A punchcode reader according to claim 1, further comprising guide means disposed at the bottom of said passage for directing the movement of said dosimeter upon exit form said passage.

6. A method for reading encoded data for a punchcode hole array of a dosimeter having a notch therein, the method comprising the steps of:

(a) inserting said dosimeter in a punchcode reader having a vertical passage therein and having a plurality of photosensors disposed within said reader adjacent to said passage so that said dosimeter having a leading edge and a trailing edge falls by gravity through said passage;

(b) determining the orientation of said dosimeter in said passage by detecting the position of said notch on said dosimeter with said photosensors;

(c) detecting the velocity of said dosimeter by sensing said leading and said trailing edge of said dosimeter with said photosensors;

(d) detecting the presence and location of closed and open holes on said punchcode hole array with said photosensors as said dosimeter falls through said passage;

(e) verifying and converting data detected by said photosensors; and (f) given the verified and converted data detected by said photosensors, calculating the velocity of said dosimeter during travel thereof through said passage, determining the orientation of said dosimeter during travel by decoding data detected based on the orientation of said dosimeter, and recording said encoded data of said dosimeter detected by said photosensors.

7. A method as claimed in claim 6, further comprising:

making first, second and third calculations of the velocity of said dosimeter during the fall thereof through said passage, said first velocity calculation based upon the rate of travel of said leading edge of said dosimeter, said second velocity calculation based upon the rate of travel of said trailing edge of said dosimeter, and said third velocity calculation being based upon a travel time determined by detecting both said leading edge and said trailing edge of said dosimeter; and selecting, based on the location of one of the said holes in the punchcode hole array, one of said velocity calculations to decode said encoded data.

8. A method as claimed in claim 7, further comprising verifying the accuracy of the detection of closed and open holes of the punchcode hole array given a velocity calculation of the punchcode hole array as it passes through said passage.

9. A method as claimed in claim 6, wherein binary coded data is decoded based on the detection of holes of the punchcode hole array by said photosensors, and said binary coded data is converted to ASCII format using a look-up table.

* * * * *